(12) United States Patent
Park (10) Patent No.: US 11,979,254 B2
(45) Date of Patent: May 7, 2024

(54) APPARATUS AND METHOD FOR ESTIMATING COMMUNICATION RESPONSE TIME BETWEEN DIFFERENT CONTROLLERS OF A VEHICLE

(71) Applicant: HYUNDAI AUTOEVER CORP., Seoul (KR)

(72) Inventor: Ji-Woong Park, Gwangju-si (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 356 days.

(21) Appl. No.: 17/531,501

(22) Filed: Nov. 19, 2021

(65) Prior Publication Data

US 2022/0182259 A1 Jun. 9, 2022

(30) Foreign Application Priority Data

Dec. 8, 2020 (KR) ........................ 10-2020-0170111

(51) Int. Cl.
*H04L 12/40* (2006.01)
*H04L 7/033* (2006.01)
(Continued)

(52) U.S. Cl.
CPC .......... *H04L 12/4013* (2013.01); *H04L 7/033* (2013.01); *H04L 12/40013* (2013.01);
(Continued)

(58) Field of Classification Search
CPC ........... H04L 12/4013; H04L 12/40013; H04L 7/033; H04L 43/0864; H04L 47/56;
(Continued)

(56) References Cited

U.S. PATENT DOCUMENTS 10,789,114 B2   9/2020  Kim et al.
2012/0195287 A1  8/2012  Jung et al.
(Continued)

FOREIGN PATENT DOCUMENTS

JP    2020091717 A    6/2020
KR   20120087649 A    8/2012
(Continued)

OTHER PUBLICATIONS

Gradient descent method, IT guy's note for organizing mathematics; https://angeloyeo.github.io/2020/08/16/gradient_descent.html; Aug. 16, 2020; 12 pp.
(Continued)

*Primary Examiner* — Redentor Pasia
(74) *Attorney, Agent, or Firm* — Lempia Summerfield Katz LLC (57) ABSTRACT

An apparatus for estimating a communication response time between different controllers of a vehicle may include: a data transmitter of a first controller configured to measure an actual message response time required until a response message is received from a second controller after the first controller transmits a message to the second controller; an estimator of the first controller configured to receive a size of the message from the data transmitter of the first controller and reflect the received size to estimate the actual message response time according to a designated estimation logic; and a result data processor of the first controller configured to correct an estimation parameter used when the estimator estimates the message response time based on a difference between the actual message response time and the estimated message response time acquired through the estimator, and update the existing estimation parameter of the estimator.

13 Claims, 4 Drawing Sheets

(51) Int. Cl.
  *H04L 43/0864* (2022.01)
  *H04L 47/56* (2022.01)
  *H04L 67/62* (2022.01)
(52) U.S. Cl.
  CPC .......... *H04L 43/0864* (2013.01); *H04L 47/56* (2013.01); *H04L 67/62* (2022.05); *H04L 2012/40215* (2013.01); *H04L 2012/40234* (2013.01)
(58) Field of Classification Search
  CPC ............... H04L 47/28; H04L 67/62; H04L 2012/40215; H04L 2012/40234; H04L 2012/40273; H04J 3/0667
  See application file for complete search history.

(56) References Cited

U.S. PATENT DOCUMENTS

| | | | | |
|---|---|---|---|---|
| 2016/0209200 A1* | 7/2016 | Kanayama | .............. | H04L 12/40 |
| 2017/0103457 A1* | 4/2017 | Acuña-Rohter | ....... | G06Q 40/04 |
| 2017/0234786 A1* | 8/2017 | Weber | ................. | G01M 15/102 |
| | | | | 73/23.33 |
| 2017/0324675 A1* | 11/2017 | Takada | .............. | H04L 12/40163 |
| 2019/0179693 A1 | 6/2019 | Kim et al. | | |
| 2020/0077440 A1 | 3/2020 | Lee | | |
| 2020/0366760 A1* | 11/2020 | Reju | ..................... | H04L 47/283 |
| 2023/0010155 A1* | 1/2023 | Sakaue | ................. | H04L 7/0016 |

FOREIGN PATENT DOCUMENTS

| | | | |
|---|---|---|---|
| KR | 20180072506 A | 6/2018 | |
| KR | 20180077958 A | 7/2018 | |
| KR | 102030462 B1 | 10/2019 | |
| KR | 20200026508 A | 3/2020 | |
| WO | WO-2021074701 A1 * | 4/2021 | ........... H04L 41/147 |

OTHER PUBLICATIONS

Office Action cited in corresponding Korean patent application No. 10-2020-0170111; dated Dec. 8, 2021; 10 pp.

* cited by examiner

APPARATUS AND METHOD FOR ESTIMATING COMMUNICATION RESPONSE TIME BETWEEN DIFFERENT CONTROLLERS OF A VEHICLE

CROSS-REFERENCE TO RELATED APPLICATION

This application claims priority to and the benefit of Korean Patent Application No. 10-2020-0170111, filed on Dec. 8, 2020, the entire contents of which are incorporated herein by reference.

FIELD

Embodiments of the present disclosure relate to an apparatus and a method for estimating a communication response time between different controllers of a vehicle.

BACKGROUND

The statements in this section merely provide background information related to the present disclosure and may not constitute prior art.

With the improvement in the functions of vehicles, many controllers (e.g., a Micro Control Unit (MCU) and a Central Processing Unit (CPU) of an Electronic Control Unit (ECU)) are mounted in the interior of the vehicles.

The controllers of the vehicles transmit/receive data (e.g., control information and sensing information) required for a specific system (e.g., a brake system, a steering system, or a transmission system) via communication with each other, thereby using the transmitted/received data to perform the functions of each corresponding system.

The data is transferred via a communication system (e.g., a Controller Area Network (CAN), a Local Interconnect Network (LIN) or Ethernet) of the vehicle.

An existing event or interrupt-based application execution method may have difficulties in guaranteeing an execution time in a real-time system because the execution time changes depending on the size and the processing speed of the data (or the message). Examples of existing event-based application execution methods may include a method in which a second controller executes a second application when the data processed by a first application executed by a first controller is transmitted and received by the second controller.

SUMMARY

In order to overcome disadvantages of existing event-based scheduling methods (e.g., difficulties in correcting the execution time in real-time systems), a deterministic scheduling method may be applied. The deterministic schedule refers to a network of tasks of a plurality of applications connected to each other with dependencies that describe the task to be performed, the execution time of the task, and the planned completion of all of the tasks of the plurality of applications. However, to apply the deterministic scheduling method, an accurate task offset needs to be set. To set the accurate task offset for the deterministic scheduling method, a message processing and transmission time needs to be estimated. However, when the message processing and transmission time is not estimated, it is difficult to designate an accurate task offset.

Moreover, since it is difficult to estimate the message processing and transmission time in a multi-controller environment of the above mentioned vehicles, it is more difficult to designate an accurate task offset.

For example, when an offset larger than an actual consuming time (e.g., an actual message processing and transmission time) is designated in a communication process, the available times of the controllers may be reduced. On the contrary, when an offset smaller than the actual consuming time is designated, a problem, e.g., a data synchronization error, may occur during a data synchronization process.

Therefore, when applying the deterministic scheduling method during communication between different controllers of the vehicle, there is a need for a technology for estimating a communication response time (e.g. time required for transmitting/receiving data) between different controllers of a vehicle which can decide a start point offset of an application with high accuracy by measuring or estimating a communication response time close to an actual consuming time (e.g., an actual message processing and transmission time in a communication process).

Various embodiments are directed to an apparatus and a method for estimating a communication response time between different controllers of a vehicle, which can measure or estimate a communication response time close to an actual consuming time (e.g., an actual message processing and transmission time), when applying a deterministic scheduling method during communication between different controllers of a vehicle, thereby deciding a start point offset of an application with high accuracy.

In an embodiment of the present disclosure, an apparatus for estimating a communication response time between different controllers of a vehicle may include: a data transmitter of a first controller of the vehicle configured to measure an actual message response time required until a response message is received by the first controller from a second controller of the vehicle after a first controller transmits a message to the second controller; an estimator of the first controller configured to receive a size of the message from the data transmitter of the first controller and reflect the received size to estimate the actual message response time, wherein the estimate includes determining an estimated message response time according to a designated estimation logic; and a result data processor configured to perform a correction function that includes correcting an estimation parameter used when the estimator estimates the message response time based on a difference between the actual message response time and the estimated message response time acquired through the estimator and updating the existing estimation parameter of the estimator with a corrected estimation parameter.

The apparatus may further include a host configured to receive the actual message response time of the message from the result data processor and the estimated message response time acquired through the estimator and perform, instead of the result data processor, the correction function.

The actual message response time may include a communication response time calculated by adding up a transmission time of the message and a response time of the message, the communication response time indicating a time consumed for communication between the first controller and the second controller.

The communication response time may correspond to a time calculated by subtracting a message response time consumed by the second controller from a message response time measured by the first controller.

When a message processed by an application of the first controller is transmitted to the second controller, an estimated message transmission time corresponding to ½ of the communication response time may be reflected to set a start offset of an application to be executed by the second controller, according to a deterministic scheduling method. Furthermore, when the message processed by the application of the second controller is retransmitted to the application of the first controller, the estimated message response time corresponding to ½ of the communication response time may be reflected to set a start offset of the application to be executed by the first controller, according to the deterministic scheduling method.

In order to estimate the communication response time close to an actual communication response time, the estimator may repeatedly perform the estimating of the actual message response time and the updating of the estimated parameter.

The time value between the first and second controllers may have the same time stamp synchronized through a Precision Time Protocol (PTP).

In an embodiment, a method for estimating a communication response time between different controllers of a vehicle may include: measuring, by a data transmitter of a first controller of the vehicle, an actual message response time required until a response message is received by the first controller from a second controller of the vehicle after a first controller transmits a message to the second controller; receiving, by an estimator of the first controller, a size of the message from the data transmitter of the first controller, and reflecting, by the estimator, the received size to estimate the actual message response time, where the estimate includes determining an estimated message response time according to a designated estimation logic; and performing, by a result data processor of the first controller, a correction function that includes correcting an estimation parameter used when the estimator estimates the actual message response time based on the difference between the actual message response time and the estimated message response time acquired through the estimator and updating the existing estimation parameter of the estimator with a corrected estimation parameter.

The method may further include performing, by a host instead of the result data processor, the correction function. The performing by the host of the correction function may include receiving the actual message response time of the message from the result data processor of the first controller and the estimated message response time acquired through the estimator, correcting an estimation parameter used when the estimator estimates the actual message response time based on a difference therebetween, and transmitting the corrected estimation parameter to the result data processor.

The result data processor may correct the estimation parameter used when the estimator estimates the actual message response time based on the difference between the communication response times included in the message response time. The communication response time may indicate a time which is consumed for communication between the first and second controllers and is calculated by adding the message transmission time and the message response time.

The communication response time may be a time calculated by subtracting a message response time consumed by the second controller from a message response time measured by the first controller.

When a message processed by an application of the first controller is transmitted to the second controller, an estimated message transmission time corresponding to ½ of the communication response time may be reflected to set a start offset of an application to be executed by the second controller according to a deterministic scheduling method. Furthermore, when the message processed by the application of the second controller is retransmitted to the application of the first controller, the estimated message response time corresponding to ½ of the communication response time may be reflected to set a start offset of the application to be executed by the first controller according to the deterministic scheduling method.

To estimate a communication response time close to an actual communication response time, the estimator may repeatedly perform the estimating of the actual message response time and the updating of the estimated parameter.

In accordance with the embodiments of the present disclosure, the apparatus and method for estimating a communication response time between different controllers of a vehicle may measure or estimate a communication response time close to an actual consuming time (e.g., an actual message processing and transmission time during a communication process), when applying the deterministic scheduling method during communication between different controllers of the vehicle, thereby deciding the start point offset of an application with high accuracy.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, an apparatus and method for estimating a communication response time between different controllers of a vehicle is described below with reference to the accompanying drawings through various embodiments.

It should be noted that the drawings are not to precise scale and may be exaggerated in thickness of lines or sizes of components for descriptive convenience and clarity only. Furthermore, the terms as used herein are defined by taking functions of the disclosure into account and can be changed according to the custom or intention of users or operators. Therefore, definition of the terms should be made according to the overall disclosures set forth herein.

Throughout the specification, when a certain part "includes" or "comprises" a certain component, this indicates that other components are not excluded, and may be further included unless otherwise noted. The same reference numerals used throughout the specification refer to the same constituent elements.

When a component, device, element, or the like of the present disclosure is described as having a purpose or performing an operation, function, or the like, the component, device, or element should be considered herein as being "configured to" meet that purpose or to perform that operation or function.

Further, the controllers, the data transmitter, the estimator, the result data processor, and the host described herein may be implemented by one or more processors. The one or more processors may be programmed to perform the noted purpose, operation, or function. Further, throughout the specification, the term "offset" refers to a delay time, the term "close" refers to approaching a value, the term "weight" refers to an estimation parameter representing a numerical coefficient to express its importance, and the term "bias" refers to an estimation parameter that represents a movement in a particular direction.

Figure 1:
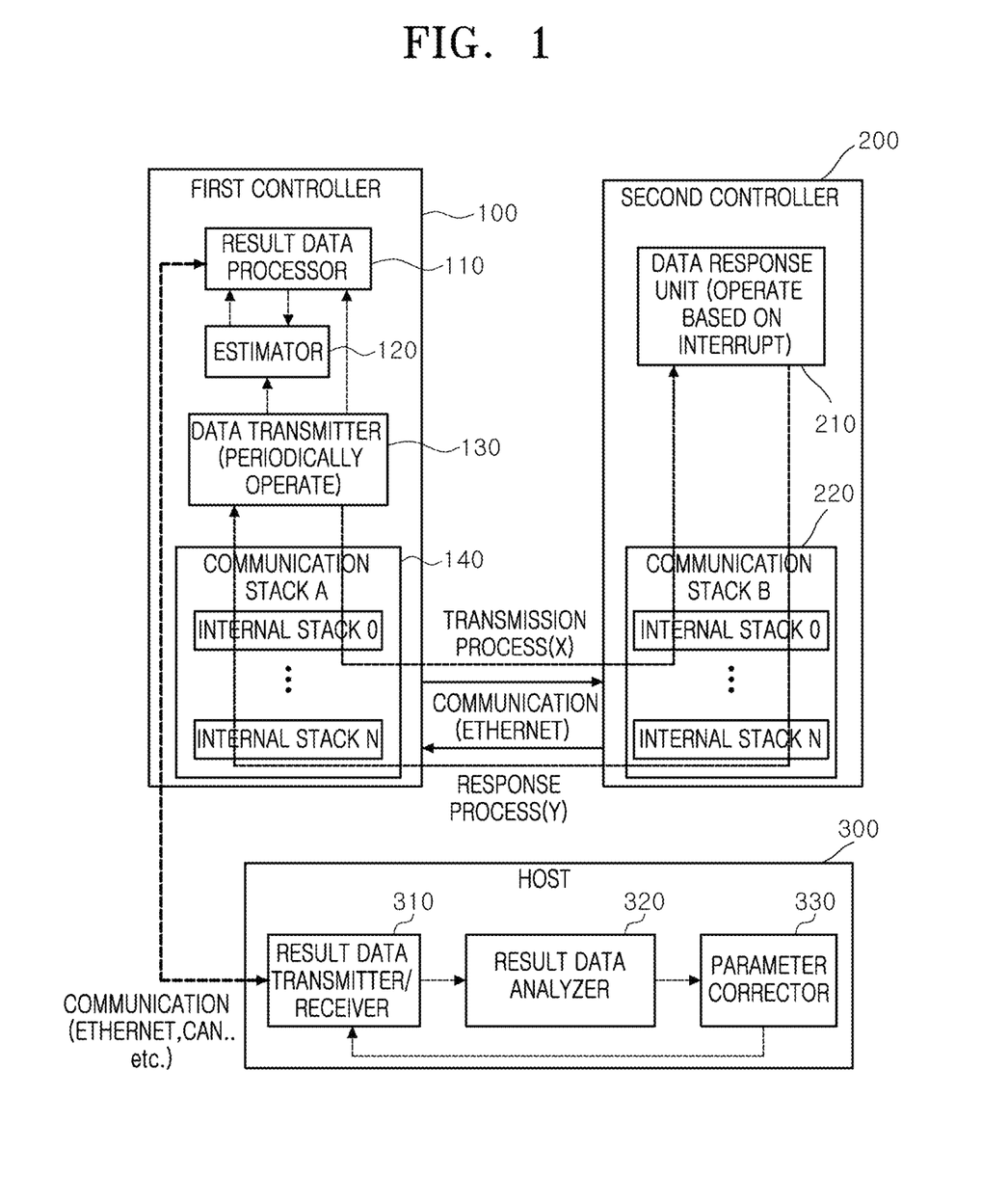
FIG. 1 is a diagram illustrating a schematic configuration of an apparatus for estimating a communication response time between different controllers of a vehicle according to an embodiment of the present disclosure.

FIG. 1 is a diagram illustrating a schematic configuration of an apparatus for estimating a communication response time between different controllers of a vehicle according to an embodiment of the present disclosure.

Referring to FIG. 1, the apparatus for estimating a communication response time between different controllers of a vehicle according to the present embodiment includes a first controller 100, a second controller 200, and a host 300. The first controller 100 includes a result data processor 110, an estimator 120, a data transmitter 130 and a communication stack A 140. The second controller 200 includes a data response unit 210 and a communication stack B 220. The host 300 includes a result data transmitter/receiver 310, a result data analyzer 320 and a parameter corrector 330.

The controller 100 transmits data to the second controller 200.

The second controller 200 receives data from the first controller 100, processes the received data and then transmits the data (or the response message) on the processed data to the first controller 100.

For example, when the first controller 100 transmits data (or the message) through the data transmitter 130 included therein, the data is delivered to the second controller 200 through the communication stack A 140 and an external communication network (e.g., Ethernet) and the data response unit 210 of the second controller 200 receives the data (or the message) through the communication stack B 220. Then, when the second controller 200 processes the data through the data response unit 210 included therein and then generates and transmits a response message (or response data), the response message is delivered to the first controller 100 through the communication stack B 220 of the second controller 200 and the external communication network (e.g., Ethernet), and the data transmitter 130 of the first controller 100 receives the data through the communication stack A 140.

In other words, the data transmitter 130 of the first controller 100 periodically repeats a transmission process X to transmit data to the second controller 200. The size of the data may be different at each time. The data response unit 210 of the second controller 200 is activated in response to the received data and executes a response process Y to transmit the response data (or the response message) to the first controller 100.

The result data processor 110 of the first controller 100 measures (collects) the time required for executing the transmission process X and the response process Y (i.e., X+Y performance time) or a message response time.

The estimator 120 of the first controller 100 receives the size of data to be transmitted through the transmission process X and estimates the time required for performing the transmission process X and the response process Y (i.e., X+Y performance time) or the message response time.

At this time, an estimation parameter of the estimator 120 includes a weight value W and a bias value b.

For reference, the estimator 120 of the first controller 100 may perform an estimation logic by using any one of publicly known technologies. For example, a back propagation method and a gradient descent method may be used as the estimation logic. The back propagation method and the gradient descent method are widely used to correct an error in a neural network which is the base of deep learning.

The gradient descent method is an optimization algorithm for finding a first order approximation. The basic idea thereof is to calculate the gradient (slope) of a function and take repeated steps in the opposite direction of the gradient (slope) of the function until a local minimum is found. Start values used as the initial values of the estimation parameters W and b may be acquired through a predetermined number of measurements. The size x of data may be differently set to acquire the estimation parameters W and b even though at least two measurements are performed. However, a predetermined number of measurements may be performed to acquire an average value.

The host 300 receives the actual time required for performing the transmission process X and the response process Y (i.e., the actual X+Y performance time) or an actual message response time which is measured by the result data processor 110 of the first controller 100, the estimated time (i.e., estimated X+Y performance time) or the estimated message response time acquired through the estimator 120, and the data size x. The host 300 corrects the estimation parameters W and b based on a difference therebetween and then transmits the corrected estimation parameters W and b to the first controller 100 to update the estimation parameters W and b of the estimator 120.

More specifically, the host 300 receives, through the result data transmitter/receiver 310, the actual time required for performing the transmission process X and the response process Y (i.e., the actual X+Y performance time) or the actual message response time from the result data processor 110 of the first controller 100, the estimated time (i.e., the estimated X+Y performance time) or the estimated message response time acquired through the estimator 120 and the data size x.

Furthermore, the host 300 compares and analyzes the actual X+Y performance time or the actual message response time received from the result data processor 110 and the estimated X+Y performance time or the estimated message response time acquired through the estimator 120 through the result data analyzer 320.

Since the time required for each controller to generate a response message (or application processing time) during the actual X+Y performance time and the estimated X+Y performance time is substantially a fixed time, only a difference in message transmission time or message response time through the Ethernet, i.e., a difference in communication response time, occurs.

Based on the comparison and analysis result, the host 300 corrects the estimation parameters W and b used when the estimator 120 estimates the X+Y performance time (or message response time) through the parameter corrector 330. Then, the host 300 transmits the corrected estimation parameters W and b to the first controller 100 through the result data transmitter/receiver 310 and updates the existing estimation parameters W and b of the estimator 120.

Thus, the estimator 120 may estimate a more accurate X+Y performance time (i.e., X+Y performance time close to the actual X+Y performance time) by using the corrected estimation parameters W and b. In other words, the estimator 120 may substantially estimate a communication response time close to an actual communication response time (i.e., a time consumed for transmitting/receiving data) obtained by adding up the message transmission time and the message response time through the Ethernet.

More specifically, when it is assumed that an Automotive Open System Architecture (AUTOSAR) classic platform is operated on an MCU for the first controller 100 and an adaptive platform or self-produced platform is operated on a CPU for the second controller 200, a task may be periodically performed by an AUTOSAR Operating System (OS) and a Runnable (an interface form of thread) of the data transmitter 130 may be repetitively operated in the first controller 100.

Furthermore, the message transmitting/receiving process in the first controller 100 through the Ethernet goes through many communication-related stacks (e.g., Com, a Socket Adaptor (SoAd), Transmission Control Protocol/Internet Protocol (TCP/IP), EthIf, Ethernet, and the like). When receiving a message through the Ethernet, the second controller 200 generates an interrupt to perform a task and the data response unit 210 is operated by the task.

Similarly, the message transmitting/receiving process in the second controller 200 through the Ethernet may also go through related communication stacks. The difference between an execution time T1 required for the data transmitter 130 to operate and transmit a message and an execution time T2 required for the data response unit 210 to operate and transmit a response message may be calculated in order to calculate a time T3 (i.e., the communication response time) required for transmitting/receiving the data (or the message), except the time required for the second controller 200 to generate a response message.

For reference, in the present embodiment, the time value between the first and second controllers 100 and 200 is synchronized through a Precision Time Protocol (PTP) which is an IEEE 1588 standard time transmission protocol for accurate synchronization between networks, such that the first and second controllers 100 and 200 can be operated with the same time stamp and the deterministic scheduling which is executed at a fixed offset position is applied to each Runnable.

Figure 2:
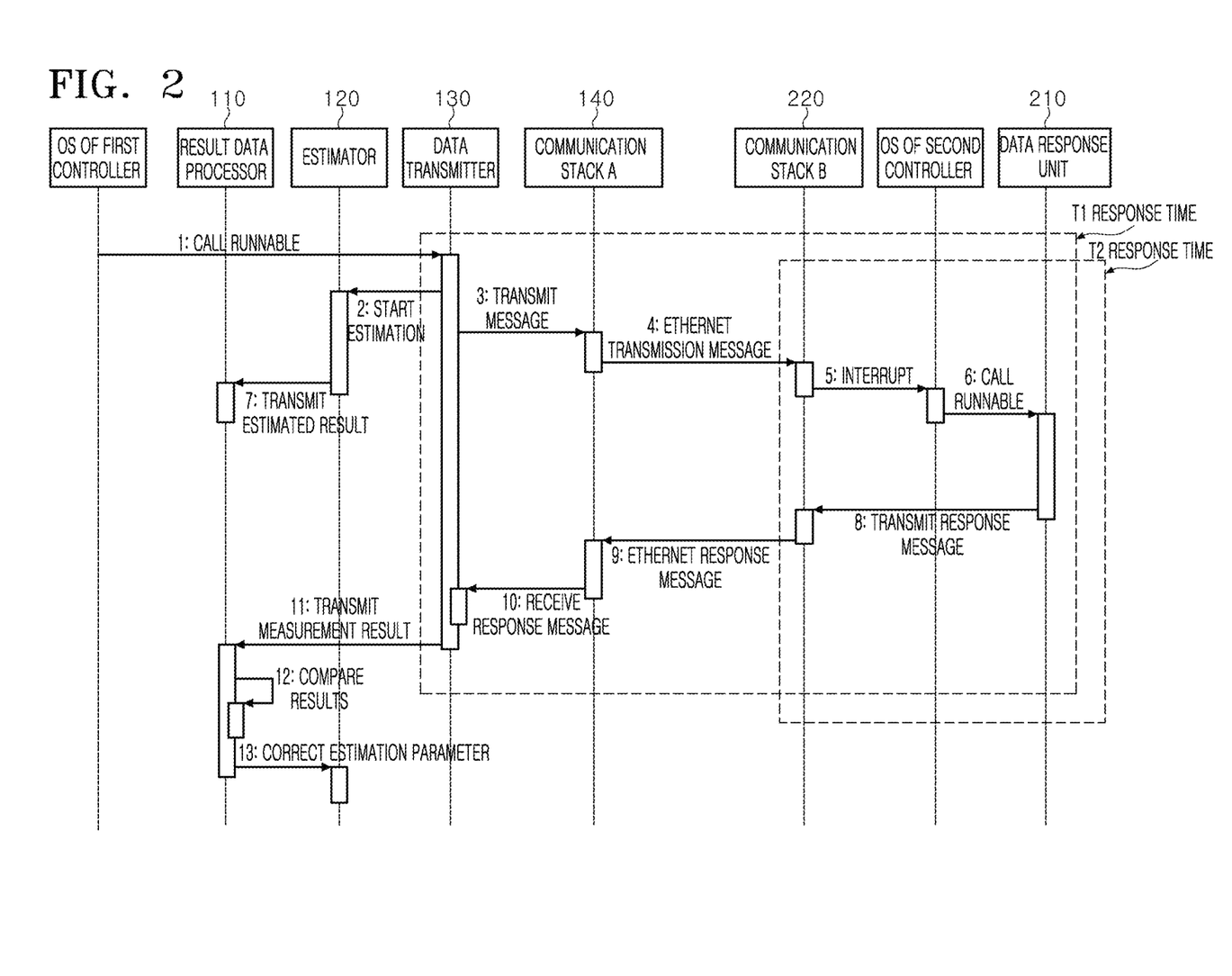
FIG. 2 is a diagram describing a method for estimating a communication response time between different controllers of a vehicle according to an embodiment of the present disclosure.

FIG. 2 is a diagram for describing a method for estimating a communication response time between different controllers of a vehicle according to an embodiment of the present disclosure.

First, a message response time (response time T1) which can be measured by the first controller 100 ranges from a Runnable call time 1 of the data transmitter 130 to a measurement result transmission time 11 of the data transmitter 130. A message response time (response time T2) consumed by the second controller 200 ranges from a Runnable call time 6 of the data response unit 210 to a response message transmission time 8 of the data response unit 210.

In the present embodiment, the communication response time corresponds to a time obtained by subtracting the message response time T2 consumed by the second controller 200 from the message response time T1 measured by the first controller 100.

When it is assumed that the message transmission time and the message response time are equal to each other, an estimated message transmission time may be calculated as the communication response time/2 and an estimated message response time may be calculated as the communication response time/2. At this time, the time value of the message response time T2 measured by the second controller 200 may be included in the data of the response message.

The data transmitter 130 may provide the size of a message (or data) to the estimator 120 before transmitting the message such that the estimator 120 may estimate a communication response time (i.e., data transmission/reception time).

The estimator 120 transmits the estimated communication response time (i.e., data transmission/reception time) to the result data processor 110.

Furthermore, when the response message is received, the data transmitter 130 transmits the response message to the result data processor 110. At this time, the data transmitter 130 may measure an actual communication response time and transmit the measured communication response time to the result data processor 110. Thus, the result data processor 110 of the first controller 100 may measure the actual communication response time (or the data transmission/reception time) or collect the actual communication response time measured by the data transmitter 130.

The result data processor 110 receives the measured actual communication response time (or the communication response time collected from the data transmitter), the communication response time estimated by the estimator 120, and the data size and compares and analyzes the actual communication response time and the estimated communication response time according to the data size.

The result data processor 110 corrects the estimation parameters W and b used when the estimator 120 estimates the communication response time based on the comparison and analysis result. The result data processor 110 updates the estimation parameters W and b of the estimator 120 with the corrected estimation parameters W and b. By repeatedly correcting and updating the estimation parameters W and b in such a way, the estimator 120 may estimate a more accurate communication response time which is close to the actual communication response time by using the corrected estimation parameters W and b.

In the present embodiment, however, the result data processor 110 may transfer the actual communication response time, the estimated communication response time, and the data size to the host 300 to correct the estimation parameters W and b of the estimator 120. Then, the result data processor 110 may receive the corrected estimation parameters W and b from the host 300 and update the estimation parameters W and b of the estimator 120.

Figure 3A:
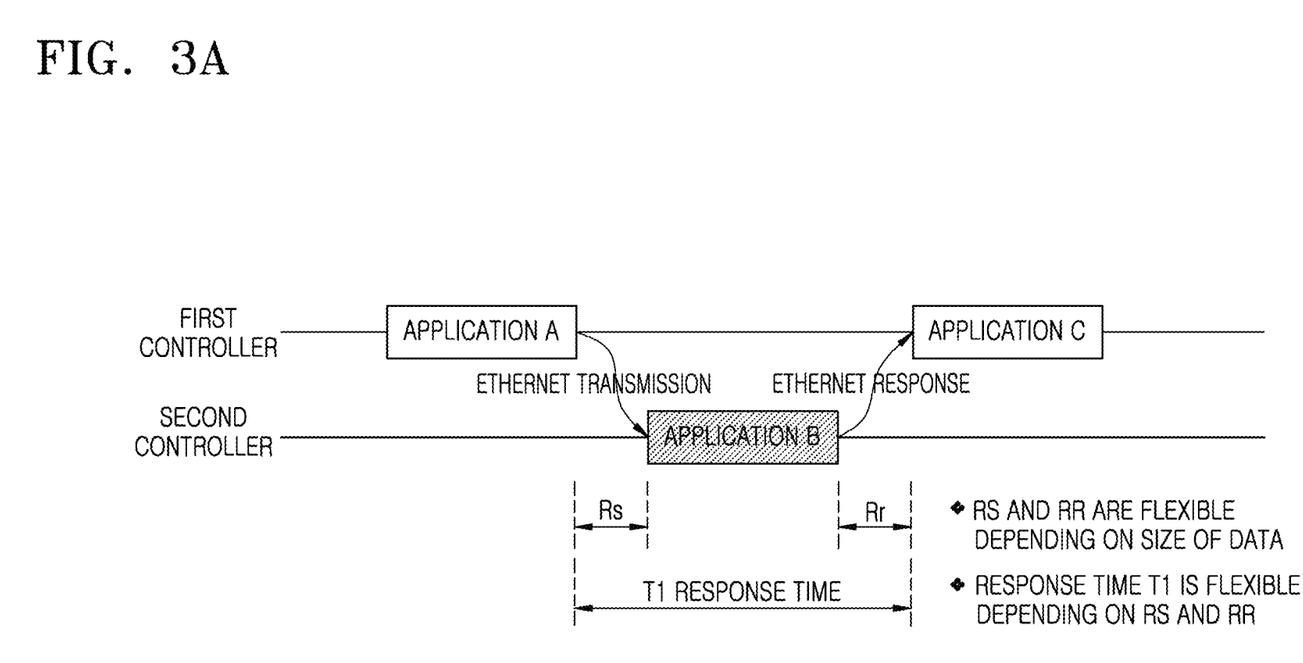
FIGS. 3A and 3B are diagrams describing differences between a conventional event-based scheduling method and a deterministic scheduling method according to an embodiment of the present disclosure.
Figure 3B:
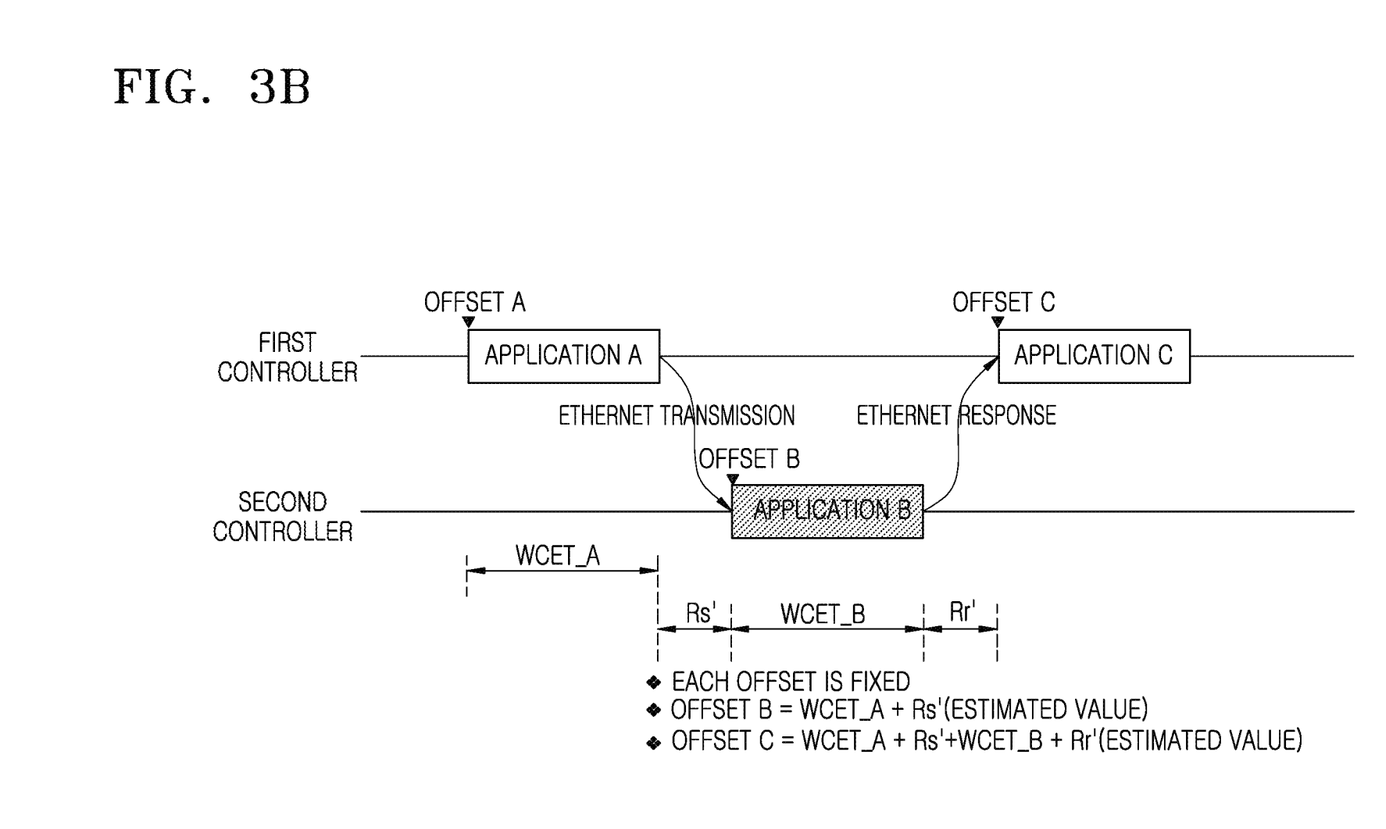

FIGS. 3A and 3B are a diagram describing differences between a conventional event-based scheduling method and a deterministic scheduling method according to an embodiment.

FIG. 3A is a diagram for describing the conventional event-based scheduling method. FIG. 3B is a diagram for describing the deterministic scheduling method according to the present embodiment.

Referring to FIG. 3A, the conventional event-based scheduling method is based on the assumption that result data (or message) processed by an application A of the first controller 100 is transmitted to an application B of the second controller 200, and result data (or the message) processed by an application B of the second controller 200 having received the result data (or the message) from the first controller is transmitted to an application C of the first controller 100. In this case, a transmission time Rs and a response time Rr become flexible depending on the size of the data (or message). As a result, the response time T1 of the message response time also becomes flexible depending on the transmission time Rs and the response time Rr.

Referring to FIG. 3B illustrating the present embodiment, however, when result data (or message) processed by the application A of the first controller 100 is transmitted to the application B of the second controller 200, a transmission time Rs' is estimated and added to a processing time WCET_A of the application A, in order to set an offset B. Furthermore, when result data (or message) processed by the application B of the second controller 200 is retransmitted to the application C of the first controller 100, a response time Rr' is estimated and added to a processing time WCET_B of the application B, in order to set an offset C.

As described above, the apparatus and method in accordance with the embodiment of the present disclosure may measure or estimate a communication response time close to an actual consuming time (e.g., an actual message processing and transmission time during a communication process), and thus decide the start point offset of an application with high accuracy, such that deterministic scheduling can be applied during communication between different controllers of the vehicle.

Although the present disclosure has been disclosed with reference to the embodiments illustrated in the drawings, the embodiments are only for illustrative purposes, and those having ordinary skill in the art will appreciate that various modifications and other equivalent embodiments are possible. Thus, the true technical scope of the present disclosure should be defined by the following claims. Furthermore, the embodiments described in this specification may be implemented with a method or process, a device, a software program, a data stream, or a signal, for example. Although a feature is discussed only in a single context (for example, discussed only in a method), the discussed feature can be implemented in another type (for example, apparatus or program). An apparatus may be implemented in suitable hardware (a processor), software executed by the processor, firmware, or in a combination thereof. The method can be implemented in a device such as a processor which generally refers to a processing device including a computer, a microprocessor, an integrated circuit, or a programmable logic device. The processor may also include a communication device, such as a computer, cellular phone, PDA (Personal Digital Assistant) and another device which facilitates information communication between end users.

The software executed by the processor may reside on a non-transitory storage medium (that is, the memory and/or the storage) such as a RAM, a flash memory, a ROM, an EPROM, an EEPROM, a register, a hard disk, a removable disk, a CD-ROM.

Although embodiments of the disclosure have been disclosed for illustrative purposes, those of ordinary skill in the art will appreciate that various modifications, additions and substitutions are possible, without departing from the scope and spirit of the present disclosure.

What is claimed is:

1. An apparatus for estimating a communication response time between different controllers of a vehicle, the apparatus comprising:
   a data transmitter of a first controller of the vehicle, the data transmitter configured to measure an actual message response time until a response message is received by the first controller from a second controller of the vehicle after the first controller transmits a message to the second controller;
   an estimator of the first controller configured to: receive a size of the message from the data transmitter of the first controller and estimate the actual message response time based on the received size of the message according to a designated estimation logic; and
   a result data processor of the first controller configured to perform a correction function that includes correcting an estimation parameter used when the estimator estimates the actual message response time based on a difference between the actual message response time and the estimated message response time acquired through the estimator, and updating the estimation parameter of the estimator with a corrected estimation parameter.

2. The apparatus of claim 1, further comprising a host configured to, receive the actual message response time of the message from the result data processor and the estimated message response time acquired through the estimator and perform, instead of the result data processor, the correction function.

3. The apparatus of claim 1, wherein the actual message response time comprises the communication response time calculated by adding up a transmission time of the message and a response time of the message, the communication response time indicating a time consumed for communication between the first controller and the second controller.

4. The apparatus of claim 3, wherein the communication response time corresponds to a time calculated by subtracting a message response time consumed by the second controller from a message response time measured by the first controller.

5. The apparatus of claim 1, wherein when a message processed by an application of the first controller is transmitted to the second controller, an estimated message transmission time corresponding to ½ of the communication response time is reflected to set a start offset of an application to be executed by the second controller, according to a deterministic scheduling method, and
   wherein when the message processed by the application of the second controller is retransmitted to the application of the first controller, an estimated message response time corresponding to ½ of the communication response time is reflected to set a start offset of the application to be executed by the first controller, according to the deterministic scheduling method.

6. The apparatus of claim 1, wherein to estimate a communication response time close to an actual communication response time, the estimator repeatedly performs the estimating of the actual message response time and the updating of the estimation parameter.

7. The apparatus of claim 1, wherein a time value between the first and second controllers has the same time stamp synchronized through a Precision Time Protocol (PTP).

8. A method for estimating a communication response time between different controllers of a vehicle, the method comprising:
   measuring, by a data transmitter of a first controller of the vehicle, an actual message response time required until a response message is received by the first controller from a second controller of the vehicle after the first controller transmits a message to the second controller;
   receiving, by an estimator of the first controller, a size of the message from the data transmitter of the first controller and reflecting, by the estimator, the received size of the message to estimate the actual message response time, wherein the estimate includes determination of an estimated message response time according to a designated estimation logic; and
   performing, by a result data processor of the first controller, a correction function including correcting an estimation parameter used when the estimator estimates the actual message response time based on a difference between the actual message response time and the estimated message response time acquired through the estimator and updating the estimation parameter of the estimator with a corrected estimation parameter.

9. The method of claim 8, further comprising performing, by a host instead of the result data processor, the correction function,
   wherein the performing, by the host, of the correction function includes receiving the actual message response time from the result data processor of the first controller and the estimated message response time acquired through the estimator, correcting the estimation parameter used when the estimator estimates the actual message response time based on a difference therebetween, and transmitting the corrected estimation parameter to the result data processor.

10. The method of claim 8, wherein the actual message response time includes the communication response time,
    wherein the result data processor corrects the estimation parameter used when the estimator estimates the actual message response time based on the difference between the communication response times included in the actual message response time,
    wherein the communication response time indicates a time which is consumed for communication between the first and second controllers and is calculated by adding up a message transmission time and a response time of the message.

11. The method of claim 10, wherein the communication response time is a time calculated by subtracting a message response time consumed by the second controller from a message response time measured by the first controller.

12. The method of claim 8, wherein when a message processed by an application of the first controller is transmitted to the second controller, an estimated message transmission time corresponding to ½ of the communication response time is reflected to set a start offset of an application to be executed by the second controller according to a deterministic scheduling method, and
    wherein when the message processed by the application of the second controller is retransmitted to the application of the first controller, an estimated message response time corresponding to ½ of the communication response time is reflected to set a start offset of the application to be executed by the first controller according to the deterministic scheduling method.

13. The method of claim 8, wherein in order to estimate a communication response time close to an actual communication response time, the estimator repeatedly performs the estimating of the actual message response time and the updating of the estimation parameter.

* * * * *